US008566863B2

(12) United States Patent
Yun et al.

(10) Patent No.: US 8,566,863 B2
(45) Date of Patent: Oct. 22, 2013

(54) DIGITAL BROADCAST RECEIVER AND METHOD FOR PROCESSING EMERGENCY ALERT SYSTEM DATA IN DIGITAL BROADCAST RECEIVER

(75) Inventors: Chang Sik Yun, Anyang-si (KR); Jin Pil Kim, Seoul (KR); Joon Hui Lee, Seoul (KR); Kyung Ho Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 12/688,355

(22) Filed: Jan. 15, 2010

(65) Prior Publication Data

US 2010/0186030 A1 Jul. 22, 2010

Related U.S. Application Data

(60) Provisional application No. 61/145,094, filed on Jan. 15, 2009, provisional application No. 61/145,573, filed on Jan. 18, 2009.

(51) Int. Cl.
*H04N 7/10* (2006.01)

(52) U.S. Cl.
USPC .......................................................... 725/33

(58) Field of Classification Search
None
See application file for complete search history.

(56) References Cited

U.S. PATENT DOCUMENTS

| | | | | |
|---|---|---|---|---|
| 5,768,539 | A * | 6/1998 | Metz et al. | 709/249 |
| 2004/0133928 | A1 | 7/2004 | Jerding et al. | |
| 2005/0086685 | A1* | 4/2005 | Rahman et al. | 725/33 |
| 2005/0229206 | A1* | 10/2005 | Pugel et al. | 725/33 |
| 2006/0130107 | A1* | 6/2006 | Gonder et al. | 725/110 |
| 2007/0121800 | A1* | 5/2007 | Rodkey et al. | 379/37 |
| 2007/0136743 | A1* | 6/2007 | Hasek et al. | 725/33 |
| 2007/0143812 | A1* | 6/2007 | Choi | 725/132 |

FOREIGN PATENT DOCUMENTS

| | | | |
|---|---|---|---|
| KR | 10-2006-0029985 | A | 4/2006 |
| KR | 10-2006-0046886 | A | 5/2006 |
| KR | 10-2006-0091862 | A | 8/2006 |

* cited by examiner

*Primary Examiner* — Cai Chen
(74) *Attorney, Agent, or Firm* — Birch, Stewart, Kolasch & Birch, LLP

(57) ABSTRACT

An IPTV and a method of processing emergency alert system (EAS) data in an IPTV are provided. The method includes receiving the EAS data, processing an EAS message based on the received EAS data, and sending response information (RI) data to a server.

24 Claims, 19 Drawing Sheets

FIG. 1

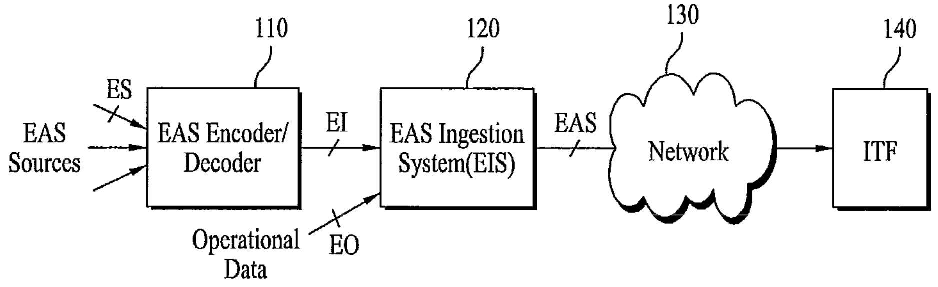

FIG. 2

| Interface /Entities | Descriptions |
|---|---|
| ES | Indicates an EAS source. Emergency alert information items are distributed from one or more reliable sources through this interface. |
| EI | Indicates an EAS input. EAS information is transferred from an EAS encoder/decoder to an EIS through this interface. |
| EO | Indicates EAS operational data. Settings or parameters, with which the EIS system can actually operate, can be received through this interface. The EIS system includes this interface to allow the user to access the system to change settings or parameters while viewing the same. |
| EAS | This interface allows EAS data output from the EIS to be distributed over a network. |

FIG. 8

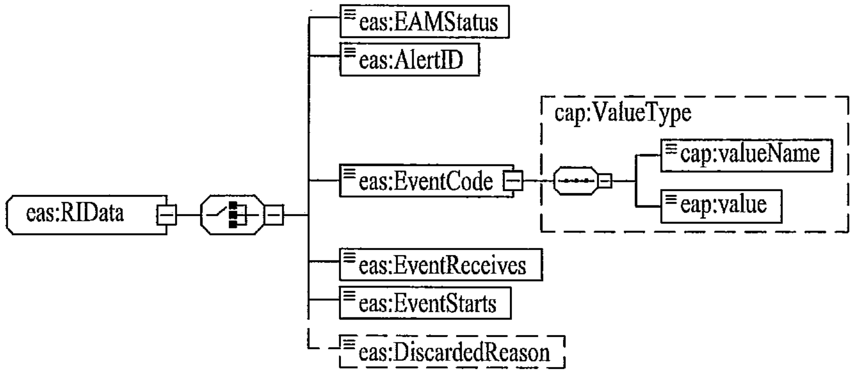

```
<simpleType name="DiscardedReasonType">
    <restriction base="integer"/>
</simpleType>
<simpleType name="EAMType">
        <restriction base="integer"/>
</simpleType>
<complexType name="RIdataType">
    <choice>
        <element name="EAMStatus" type="eas:EAMType"/>
        <element name="AlertID" type="string"/>
        <element name="EventCode" type="cap:ValueType"/>
        <element name="EventReceives" type="dateTime"/>
        <element name="EventStarts" type="dateTime"/>
        <element name="DiscardedReason" type="eas:DiscardedReasonType" minOccurs="0"/>
    </choice>
</complexType>
```

FIG. 9A

| Name | Definition |
|---|---|
| DiscardedReasonType | DiscardedReasonType describes the reason why the EAS message has not been processed at an interactive TV and includes the following data types.<br>1: PastMessage<br>A past message may be discarded since a newly received message has higher priority. This type defines this situation.<br>2: DuplicatedMessage<br>When the same message as a previously received message is received, the received message may be ignored or discarded.<br>3: OverrunMessage<br>When the number of received EAS messages or the amount of a received EAS message is great to the extent that the message(s) cannot be processed at the interactive TV, this situation is reported to the server such that EAS message processing is performed at appropriate intervals.<br>4: UnavailableSystemResources<br>This type is set when the current system resources are unavailable. In this case, the EIS system may identify this situation and retransmit the EAS message at an appropriate time.<br>5: SystemFailure<br>The EAS message may be discarded when the system has a problem. In this case, when the EIS system receives this message through RI data, the EIS system may transmit the EAS message using a different means.<br>6: UnexpectedError<br>The EAS message may not be processed and then be discarded not only due to system failure but also for unknown reasons. In this case, when the EIS system receives this message through RI data, the EIS system may transmit the EAS message using a different means. |

FIG. 9B

| Name | Definition |
|---|---|
| EAMType | EAMType indicates the processing result of the current alert message and includes the following data types.<br>1: Completed<br>This type indicates that the EAS message has been normally processed.<br>2: Activated (Progressing)<br>This type indicates that the EAS message is being normally processed, i.e., indicates that the EAS message is in active.<br>3: Scheduled<br>This type indicates that the EAS message has been scheduled according to priority. When corresponding information is displayed on the screen at a scheduled time, the EAS message is reactivated.<br>4: Postponed<br>This type indicates that activation of the EAS message has been slightly postponed due to the status of the receiver or the system. When the EAS message has been postponed, the server retransmits the EAS message after modifying and specifying the EAMType or priority of the EAS message. In this case, the receiver may operate with the modified EAS message.<br>5: Discarded<br>When an EAS message has been discarded, the server may retransmit the EAS message after modifying and specifying the EAMType or priority of the EAS message. In this case, the receiver may operate with the modified EAS message. |

FIG. 9C

| Name | Definition |
|---|---|
| RIdataType | An EAMStatus element may have the EAMType value defined above as a value indicating the processed status of the current alert message.<br><br>An AlertID element is an identifier that can uniquely identify the EAS message.<br><br>An EventCode element is a short system-specific string that can identify the event type of the EAS message. Examples of this element include High Wind Advisory (HWA) and Flood Statement (FLS).<br><br>An EventReceives element indicates the time at which an event is received.<br><br>An EventStarts element indicates the time at which an event starts after being processed.<br><br>A DiscardedReason element may have the DiscardedReasonType value defined above as a value describing the reason why the EAS message has not been processed at the interactive TV. |

FIG. 10

```
<?xml version="1.0" encoding="UTF-8"?>
<EASMetadata xmlns="http://www.atis.org/schemas/0800012/eas/1"
xmlns:xsi="http://www.w3.org/2001/XMLSchema-instance"
xsi:schemaLocation="http://www.atis.org/schemas/0800012/eas/1 ATIS-0800012.xsd"
xmlns:cap="http://www.atis.org/schemas/0800012/cap/1"
xmlns:mps="http://www.atis.org/schemas/0800013/mps/1"
xmlns:xml="http://www.w3.org/XML/1998/namespace">>
<AlertResult>Completed</AlertResult>
<AlertID>KRA0-0306112239-SW</AlertID>
<EventCode>CAE</EventCode>
<EventReceives>2009-01-06T11:32:12</EventReceives>
<EventStarts>2009-01-06T12:01:16</EventStarts>
<EventExpires>2009-01-06T13:00:12</EventExpires>
</EASData>
</EASMetaData>
```

FIG. 11

```
<?xml version="1.0" encoding="UTF-8"?>                //2. In the case where EAS is in progress.
<EASMetadata xmlns="http://www.atis.org/schemas/0800012/eas/1"
xmlns:xsi="http://www.w3.org/2001/XMLSchema-instance"
xsi:schemaLocation="http://www.atis.org/schemas/0800012/eas/1 ATIS-0800012.xsd"
xmlns:cap="http://www.atis.org/schemas/0800012/cap/1"
xmlns:mps="http://www.atis.org/schemas/0800013/mps/1"
xmlns:xml="http://www.w3.org/XML/1998/namespace">>
<AlertResult>Activated</AlertResult>
<AlertID>KRA0-0306112239-SW</AlertID>
<EventCode>CAE</EventCode>
<EventReceives>2009-0106T11:32:12</EventReceives>
<EventStarts>2009-01-06T12:01:16</EventStarts>
<EventExpires>0</EventExpires>
</EASData>
</EASMetaData>
```

FIG. 12

```
<?xml version="1.0" encoding="UTF-8"?>
<EASMetadata xmlns="http://www.atis.org/schemas/0800012/eas/1"
xmlns:xsi="http://www.w3.org/2001/XMLSchema-instance"
xsi:schemaLocation="http://www.atis.org/schemas/0800012/eas/1
ATIS-0800012.xsd"
xmlns:cap="http://www.atis.org/schemas/0800012/cap/1"
xmlns:mps="http://www.atis.org/schemas/0800013/mps/1"
xmlns:xml="http://www.w3.org/XML/1998/namespace">>
<AlertResult>Scheduled</AlertResult>
<AlertID>KRA0-0306112239-SW</AlertID>
<EventCode>CAE</EventCode>
<EventReceives>2009-0106T11:32:12</EventReceives>
<EventStarts>0</EventStarts>
<EventExpires>0</EventExpires>
</EASMetaData>
```

FIG. 13

```
<?xml version="1.0" encoding="UTF-8"?>
<EASMetadata xmlns="http://www.atis.org/schemas/0800012/eas/1"
xmlns:xsi="http://www.w3.org/2001/XMLSchema-instance"
xsi:schemaLocation="http://www.atis.org/schemas/0800012/eas/1
ATIS-0800012.xsd"
xmlns:cap="http://www.atis.org/schemas/0800012/cap/1"
xmlns:mps="http://www.atis.org/schemas/0800013/mps/1"
xmlns:xml="http://www.w3.org/XML/1998/namespace">>
<AlertResult>Discarded</AlertResult>
<AlertID>KRA0-0306112239-SW</AlertID>
<EventCode>CAE</EventCode>
<EventReceives>2009-0106T11:32:12</EventReceives>
<EventStarts>0</EventStarts>
<EventExpires>0</EventExpires>
</EASData>
<DiscaredReason>DuplicatedEvent</DiscaredReson>
</EASMetaData>
```

FIG. 15

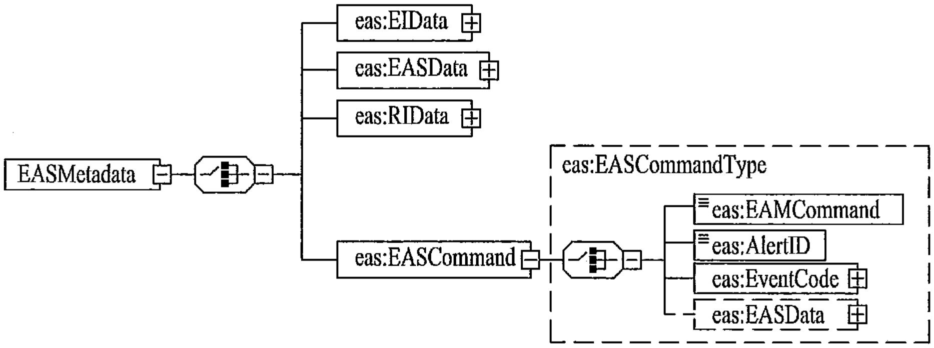

FIG. 16

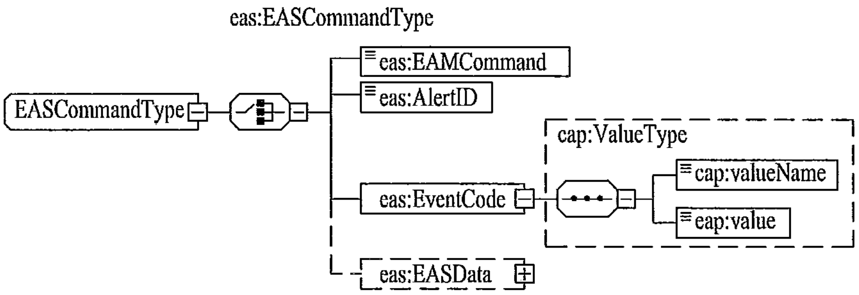

```
<simpleType name="EAMCommandType">
        <restriction base="integer"/>
</simpleType>
<complexType name="EASCommandType">
        <choice>
                <element name="EAMCommand" type="eas:EAMCommandType"/>
                <clement name="AlertID" type="string"/>
                <element name="EventCode" type="cap:ValueType"/>
                <element name="EASData" type="eas:EASdataType" minOccurs="0"/>
        </choice>
</complexType>
```

FIG. 17

| Name | Definition |
|---|---|
| EAMCommandType | EAMCommandType is a type indicating a method for reprocessing a corresponding alert message and may have the following values.<br>1: Reprocess<br>This allows the corresponding EAS message to be reprocessed. Specifically, this allows a message to be reprocessed according to alert priority processing of the ITF.<br>2: Activate<br>This allows the EAS message to activated immediately<br>3: Schedule<br>This allows the EAS message to be scheduled to be activated according to time or priority. The time to activate the EAS message may be transferred through an EventOnset element. EAS data also may be included in the EAS command so that the EAS message is scheduled through AlertPriority or EventOnset.<br>4: Discard<br>This allows the corresponding EAS message to be discarded. |
| EASCommandType | An EAMCommand element indicates a processing method that should be employed by the receiver that has received the message. This may employ the EAMCommandType values defined above.<br><br>An AlertID element is an identifier that can uniquely identify the EAS message.<br><br>An EventCode element is a short system-specific string that can identify the event type of the EAS message. Examples of this element include High Wind Advisory (HWA) and Flood Statement (FLS).<br><br>An EASData element may be transmitted while selectively including the EAS message. In the case where a command requesting reprocessing of a message is issued when the receiver has discarded the message to be processed, there may be a need to include the message in the command to be transmitted since the receiver might have actually deleted the message. |

FIG. 19

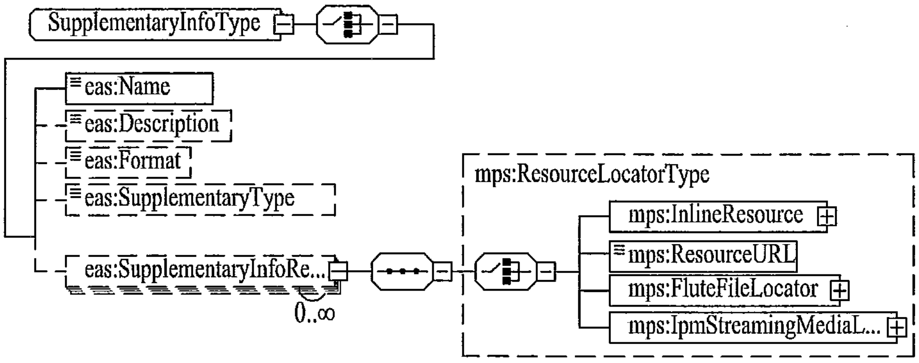

```
<complexType name="SupplementaryInfoType">
        <choice>
            <element name="Name" type="string"/>
            <element name="Description" type="string" minOccurs="0"/>
            <element name="Format" minOccurs="0">
                <simpleType>
                    <restriction base="string">
                        <pattern value="Text"/>
                        <pattern value="Contact Info"/>
                        <pattern value="Still Image"/>
                        <pattern value="Video Clip"/>
                        <pattern value="Audio Clip"/>
                    </restriction>
                </simpleType>
            </element>
            <element name="InfomationType" minOccurs="0">
                <simpleType>
                    <restriction base="string">
                        <pattern value="Website"/>
                        <pattern value="Contacts"/>
                        <pattern value="Weather Picture"/>
                        <pattern value="Guide Map"/>
                    </restriction>
                </simpleType>
            </element>
            <element name="SupplementaryInfoReference" type="mps:ResourceLocatorType"
minOccurs="0" maxOccurs="unbounded"/>
        </choice>
    </complexType>
```

DIGITAL BROADCAST RECEIVER AND METHOD FOR PROCESSING EMERGENCY ALERT SYSTEM DATA IN DIGITAL BROADCAST RECEIVER

This application claims the benefit of U.S. provisional Patent Application Nos. 61/145,094, filed on Jan. 15, 2009 and 61/145,573 filed on Jan. 18, 2009 which are hereby incorporated by reference as if fully set forth herein.

BACKGROUND OF THE INVENTION

1. Field of the Invention

The present invention relates to a digital broadcast receiver, and more particularly, to a digital broadcast receiver that processes EAS data.

2. Discussion of the Related Art

In a conventional Emergency Alert System (EAS), EAS data is transmitted only in one direction, i.e., from a broadcast transmitter to a broadcast receiver. The broadcast receiver merely outputs the received EAS data on the screen.

Thus, the conventional EAS system has a problem in that it is not possible to confirm the result of processing of the EAS by the broadcast receiver. The conventional EAS system also has a problem in that it is not possible to adjust an EAS data retransmission method according to the processing result.

SUMMARY OF THE INVENTION

It is an object of the present invention to provide a system that can confirm the result of processing of EAS data.

It is another object of the invention to provide a method for transmitting more optimal EAS data using the EAS data processing result.

It is still another object of the invention to provide a more efficient method for providing supplementary information associated with EAS data.

In one embodiment of the present invention to achieve the above objects, provided herein is a method of processing emergency alert system (EAS) data in a digital broadcast receiver, the method including receiving the EAS data, processing an EAS message based on the received EAS data, and sending Response Information (RI) data to a server.

In another embodiment of the present invention, provided herein is a method of processing emergency alert system (EAS) data in a digital broadcast receiver, the method including receiving the EAS data, the EAS data including a first multiple elements and a supplementary information element, wherein the supplementary information element comprises a second multiple elements and a resource element necessary to access additional emergency alert information, detecting the resource element included in the supplementary information element, and performing control to access the additional emergency alert information using the resource element.

In another embodiment of the present invention, provided herein is a method of processing emergency alert system (EAS) data in a digital broadcast receiver, the method including receiving the EAS data, processing an EAS message based on the received EAS data, and displaying a reporting message identifying whether the EAS message is processed without error.

BRIEF DESCRIPTION OF THE DRAWINGS

The accompanying drawings, which are included to provide a further understanding of the invention, illustrate embodiments of the invention and together with the description serve to explain the principle of the invention.

In the drawings:

FIG. 1 illustrates a general EAS.

FIG. 2 is a table containing detailed descriptions of the interfaces/entities shown in FIG. 1.

FIG. 8 illustrates details of RI data according to an embodiment of the present invention.

FIG. 9*a*, 9*b*, 9*c* illustrate meanings of main elements of the RI data shown in FIG. 8.

FIG. 10 illustrates an example of RI data according to a first processing result of an EAS message.

FIG. 11 illustrates an example of RI data according to a second processing result of an EAS message.

FIG. 12 illustrates an example of RI data according to a third processing result of an EAS message.

FIG. 13 illustrates an example of RI data according to a fourth processing result of an EAS message.

FIG. 15 illustrates the case where an EAS command is added to EAS metadata according to an embodiment of the present invention.

FIG. 16 illustrates details of the EAS command according to an embodiment of the present invention.

FIG. 17 illustrates meanings of main elements of the EAS command shown in FIG. 16.

FIG. 19 illustrates, in more detail, a supplementary information element according to an embodiment of the present invention.

DETAILED DESCRIPTION OF THE INVENTION

Figure 3:
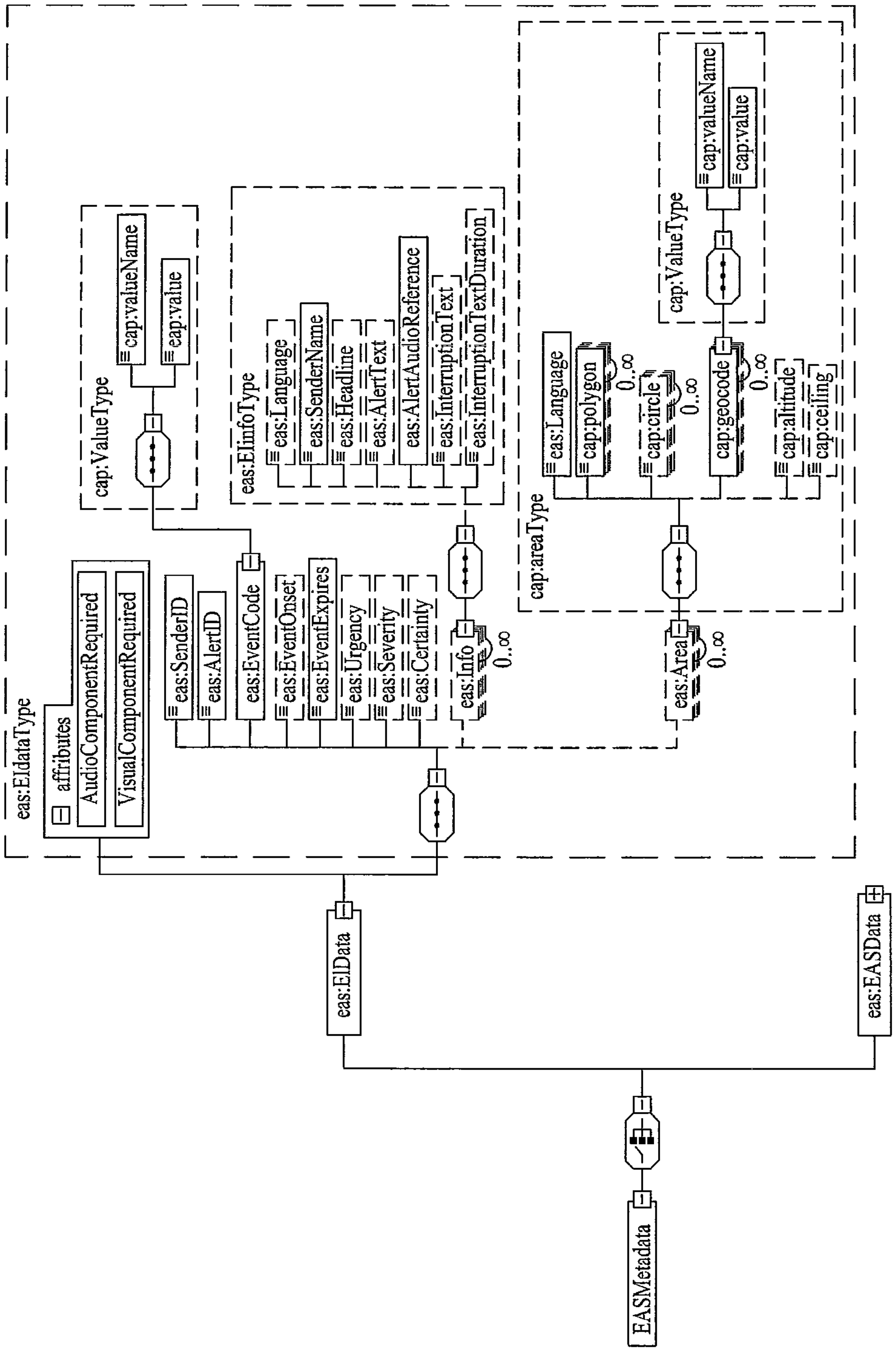
FIG. 3 illustrates EI data.

Although embodiments of the present invention will now be described with reference to the accompanying drawings and illustrations or descriptions in the drawings, the present invention is not limited to the embodiments.

Although most terms of elements in the present invention have been selected from general ones widely used in the art taking into consideration their functions in the invention, the terms may be changed depending on the intention or convention of those skilled in the art or the introduction of new technology. Some terms have been arbitrarily selected by the applicant and their meanings are explained in detail in the following description as needed. Thus, the definitions of the terms used in the invention should be determined based on the whole content of this specification together with the intended meanings of the terms rather than their simple names or meanings.

The scope of the present invention should be determined by the claims.

Examples of a digital broadcast receiver to which the present invention is applied include an IPTV and an interactive TV. In the following description, the digital broadcast receiver is exemplified by the IPTV for ease of explanation.

FIG. 1 illustrates a general EAS.

As shown in FIG. 1, an EAS encoder/decoder 110 generates and transmits an EAS message to an EAS Ingestion System (EIS) 120. The EIS 120 transmits the EAS message to an ITS 140 through a network 130. The network 130 may be, for example, the Internet and the ITF 140 may be, for example, an IPTV.

The ITF 140 is responsible for outputting an EAS message received from the network 130 and controlling a variety of resources.

FIG. 2 is a table containing detailed descriptions of the interfaces/entities shown in FIG. 1. Among the interfaces/entities shown in FIG. 2, EAS input (EI) and Emergency Alert System (EAS) interfaces relate to the receiver.

First, the EAS input (EI) is described as follows. ES messages from EAS sources are input to the encoder/decoder 110 and are then transferred to the EIS 120. The EI includes definitions of data types that include no EAS operational data. More detailed data structures can be understood from FIG. 3.

EAS data includes information items transferred through the EAS input interface and defines types of data added for EAS messages. This EAS data is needed to include information used in EAS sources and information required to display or control the EAS message in a receiver or EIS. This EAS data may correspond to EAS operational data shown in FIG. 1 and can be understood from FIG. 4.

Figure 4:
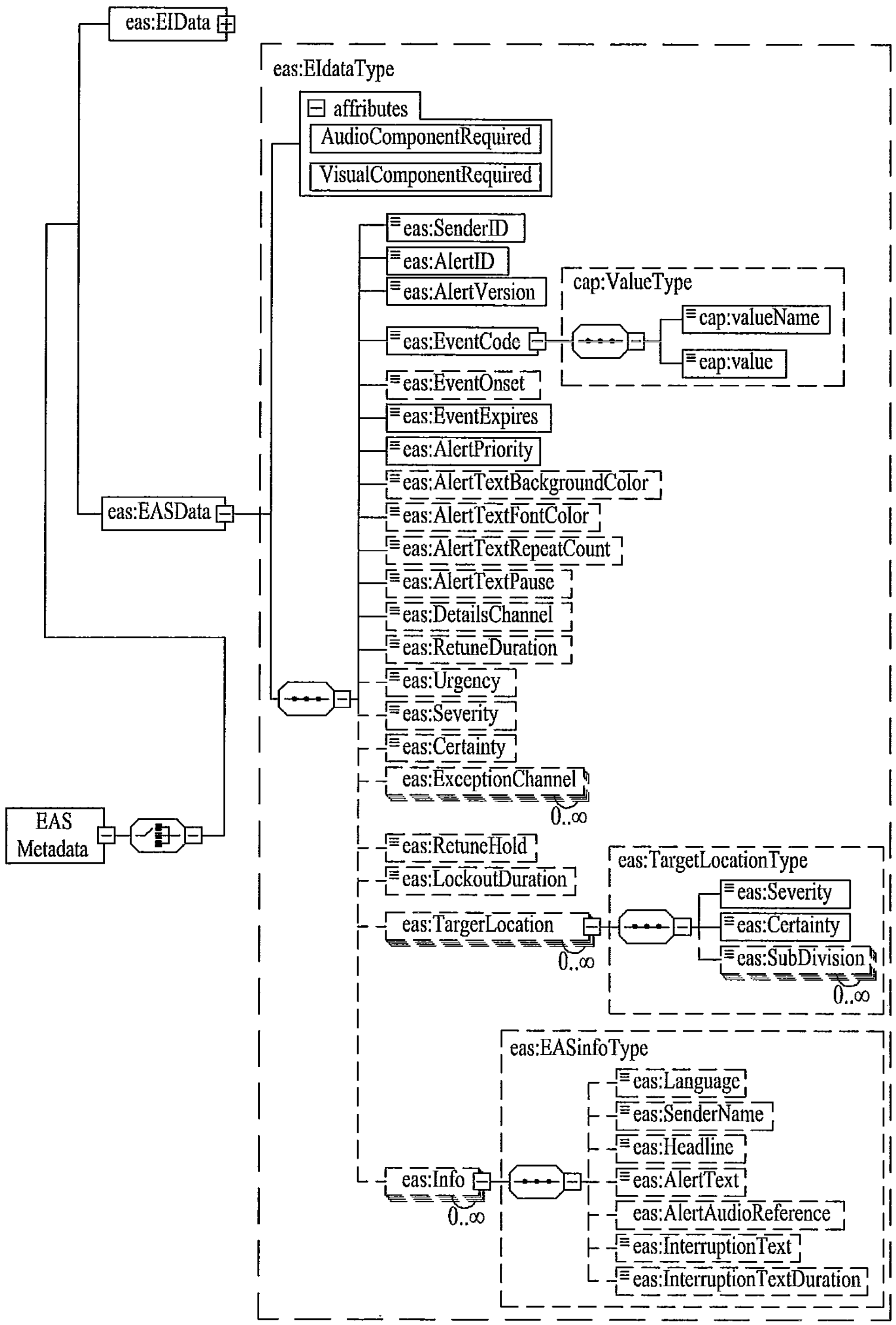
FIG. 4 illustrates EAS data.

FIG. 3 illustrates EI data. FIG. 4 illustrates EAS data.

EI data metadata illustrated in FIG. 3 is a data format that is transferred from the EAS encoder/decoder 110 to the EIS 120. EI data metadata illustrated in FIG. 4 is a data format that is transferred from the EIS 120 to the ITF 140. The data formats of FIGS. 3 and 4 are different since the entities require different data according to their functions and information items transferred to and controlled by the entities are different.

An embodiment of the present invention provides a method which enables determination as to whether or not an EAS message has been normally processed in the IPTV. In addition, an embodiment of the present invention provides a method in which retransmission is performed using a different scheme when the EAS message has not been normally processed. Further, an embodiment of the present invention provides not only a basic EAS message service but also an additional EAS-related service such as a service enabling the user to view or ask about EAS messages. This will be described in detail with reference to the drawings.

Figure 5:
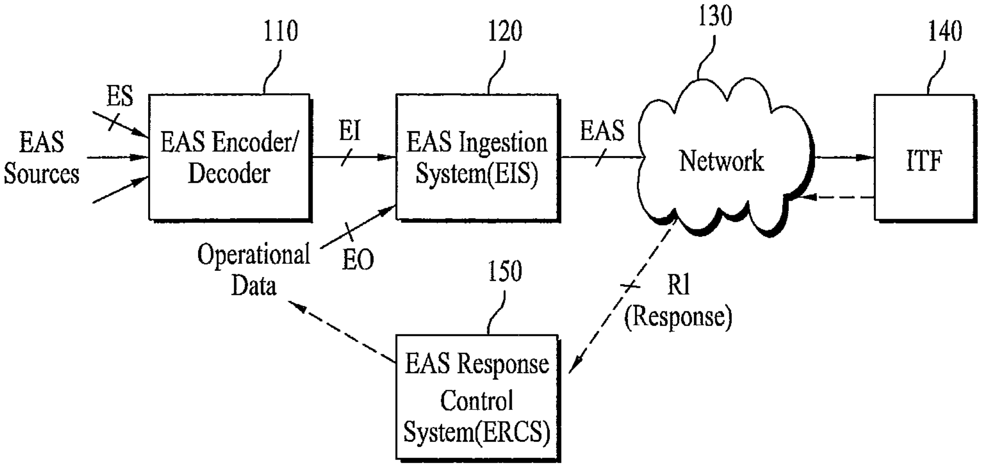
FIG. 5 illustrates an EAS according to an embodiment of the present invention.

FIG. 5 illustrates an EAS according to an embodiment of the present invention. In this embodiment, an EAS Response Control System (ERCS) 150 is added, unlike the embodiment of FIG. 1.

The ERCS 150 receives information regarding a state of the ITF 140 when the EAS message has not been processed and a state prior to or subsequent to processing of the EAS message. The ITF 140 is designed to already know the address of the ERCS 150. The server address of the ERCS 150 may be previously registered in the ITF 140 or may be acquired through a provisioning process such as remote management. An Response Information (RI) interface newly defined in the embodiment of FIG. 5 is designed to transmit response data.

Accordingly, when the receiver has not received an EAS message depending on the status of the receiver or when the user has not checked the EAS message due to cancellation (or discard) of the EAS message although the message has been received, the receiver can transmit the related information to the server if the ERCS 150 is added as shown in FIG. 5. Upon receiving the related information, the server can implement an EAS retransmission process or the like.

Figure 6:
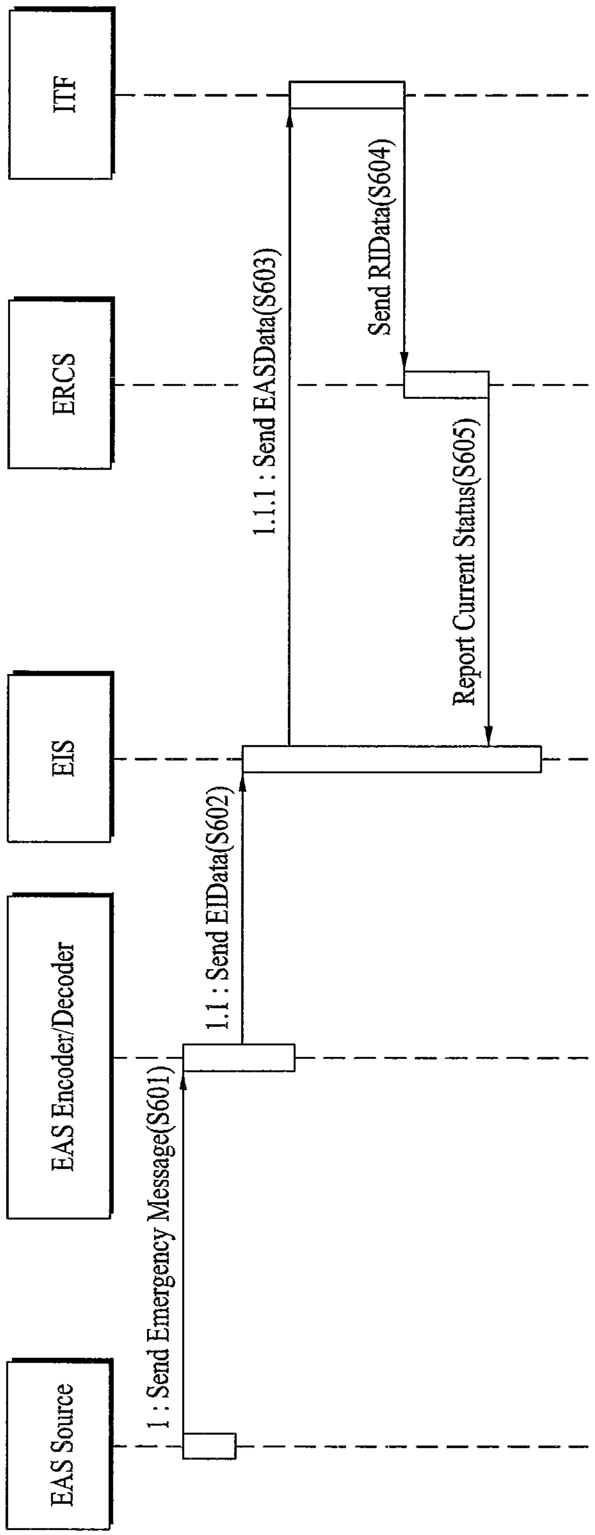
FIG. 6 is a flow chart of a method for transmitting Response Information (RI) data according to an embodiment of the present invention.

FIG. 6 is a flow chart of a method for transmitting RI data according to an embodiment of the present invention.

An EAS source transmits an EAS message to an EAS encoder/decoder (S601). The EAS encoder/decoder creates a formatted EAS message and transmits the EAS message in an EI data format to an EIS using an EI interface (S602).

The EIS transmits EAS data to an ITF through a network (S603). The ITF analyzes and processes the EAS message in the EAS data format and creates and transmits processing result data in an RI data format to the ERCS (S604).

The ERCS transmits data reporting the current status of the ITF, i.e., report_current_status information, to the EIS (S605).

The processing result data includes two types of result data, negative result data indicating that the EAS message has not been normally processed and positive result data indicating that the EAS message has been normally processed. The positive result data may be designed not to be transmitted taking into consideration a network bandwidth and the amount of processing of the ERCS server. According to another embodiment of the present invention, the ERCS and the EIS may be designed as a single server.

In this embodiment of the present invention, the EIS may collect EAS message processing results of each ITF and adjust an EAS message configuration and transmission scheme to implement a customized EAS. For example, when an EAS message, which is a more important message, has failed to be processed due to an error of setting of priorities of messages, it is possible to immediately identify the failure and modify and retransmit the EAS message.

Figure 7:
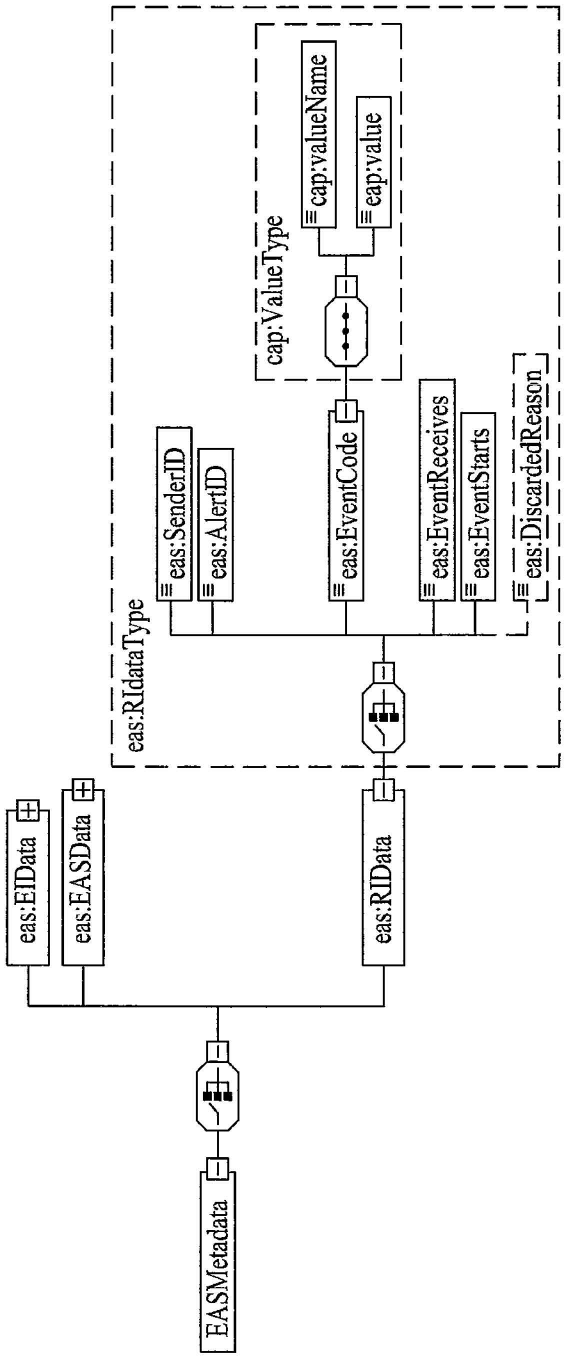
FIG. 7 illustrates the case where RI data is added to EAS metadata according to an embodiment of the present invention.

FIG. 7 illustrates the case where Response Information (RI) data is added to EAS metadata according to an embodiment of the present invention.

As shown in FIG. 7, RI data is added to EAS metadata. Accordingly, it is possible to again notify the server of the EAS message processing result and to confirm the state of the receiver (for example, the IPTV or ITF). RI data shown in FIG. 7 may correspond to RI data of S604 shown in FIG. 6.

FIG. 8 illustrates details of RI data according to an embodiment of the present invention. FIG. 9*a*, 9*b*, 9*c* illustrate meanings of main elements of the RI data shown in FIG. 8.

Specifically, FIG. 8 illustrates, in more detail, the structure and schema of the RI data shown in FIG. 7 and FIG. 9 describes functions of a discarded reason element, an EAM status element, and an RI data type which are the main elements of the RI data shown in FIG. 8.

The following is a summary of an embodiment of the present invention described above with reference to FIGS. 5 to 9.

An embodiment of the present invention defines a method for processing EAS data in an IPTV.

First, the IPTV receives EAS data which includes multiple elements.

The EAS data may have, for example, the structure shown in FIG. 7.

The IPTV processes the EAS message based on the received EAS data and transmits Response Information (RI) data to the server. The RI data includes, for example, an EAM status element and a discarded reason element. The RI data can be understood from FIGS. 7 to 9.

The EAM status element includes information identifying the current status of the processed EAS message and the discarded reason element includes information identifying the reason why the EAS message has not been processed at the IPTV.

The elements may be defined as, for example, XML schema types and the server corresponds to the ERCS shown in FIG. 5 or FIG. 6.

FIG. 10 illustrates an example of RI data according to a first processing result of an EAS message. FIG. 11 illustrates an example of RI data according to a second processing result of an EAS message.

FIG. 12 illustrates an example of RI data according to a third processing result of an EAS message. FIG. 13 illustrates an example of RI data according to a fourth processing result of an EAS message.

Using data items described above, it is possible to transmit data structures shown in FIGS. 10 to 13 to the ERCS. The data structure shown in FIG. 10 is applied when the EAS message has been normally processed at the ITF and may be named "positive response data". The data structure shown in FIG. 11 is applied when the EAS message is being normally processed at the ITF. The data structure shown in FIG. 12 is applied when processing of the EAS message has not yet started although the EAS message has been received by the ITF. The data structure shown in FIG. 13 is applied when processing of the EAS message has been discarded since it is a duplicated message although it has been received by the ITF. The ITF is, for example, an IPTV as an interactive TV.

This specification will also define a method in which the ERCS directly transfers a different method for processing the EAS message to the ITF after the ERCS has received the EAS message processing result through the RI data described above.

For example, an error is likely to occur if a specific ITF has processed the EAS message using a method different from that requested by the server. Here, the server needs to issue a correction instruction to the ITF so that the EAS message will be processed appropriately and quickly. In another example, in the case where an EAS message that should be immediately processed is scheduled, postponed, or discarded, the server needs to issue a command to the ITF so that the EAS message is immediately processed. This command may be named an "EAS command", which will be described in more detail with reference to FIG. 14.

Figure 14:
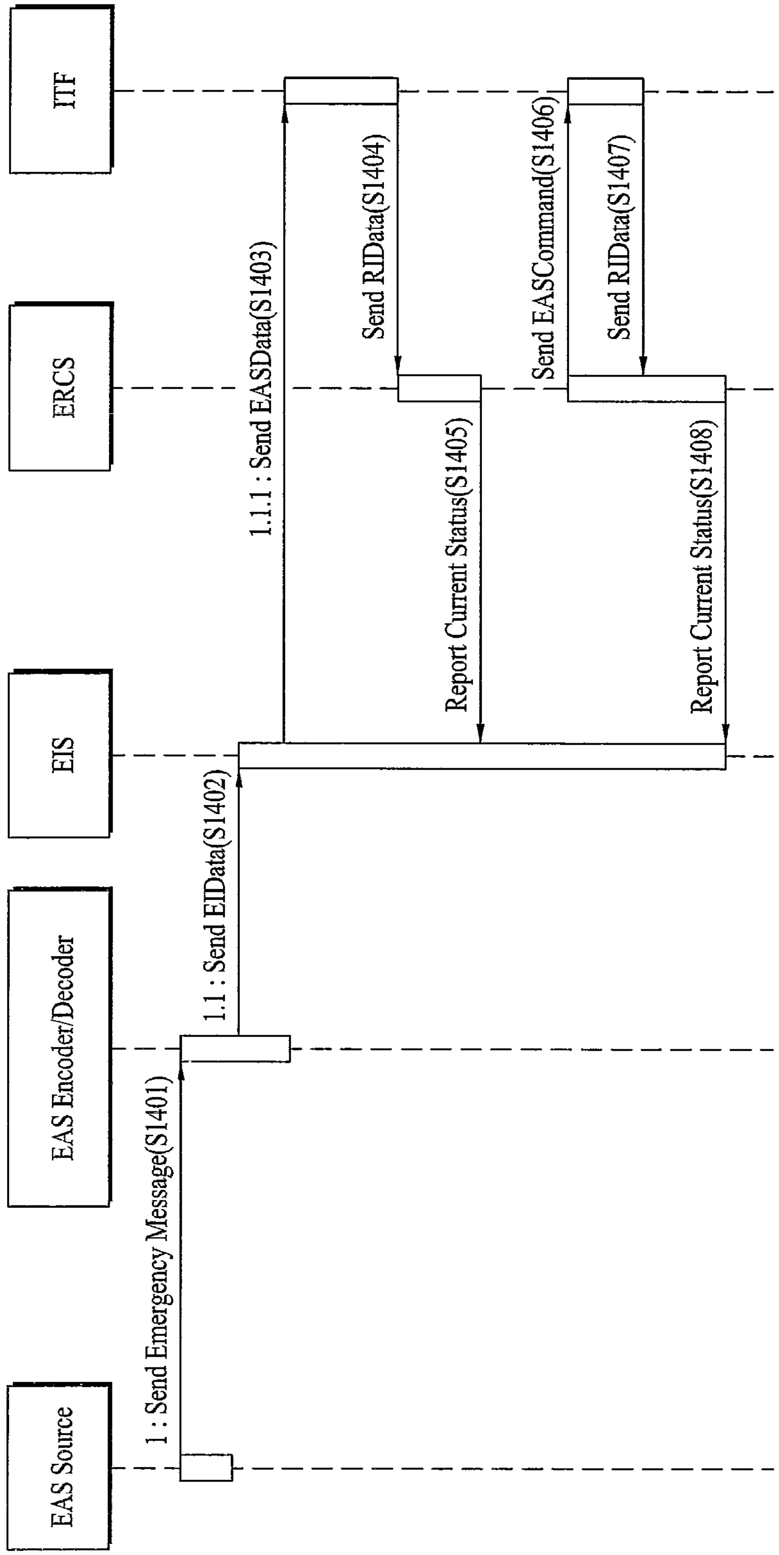
FIG. 14 is a flow chart illustrating a method for transmitting RI data according to another embodiment of the present invention.

FIG. 14 is a flow chart illustrating a method for transmitting RI data according to another embodiment of the present invention.

A detailed description of steps S1401, S1402, S1403, S1404, and S1405 shown in FIG. 14 is omitted herein since they are similar to steps S601, S602, S603, S604, and S605 shown in FIG. 6, respectively. However, unlike the method of FIG. 6, the method of FIG. 14 further includes a procedure in which a message requesting reprocessing of a specific EAS message is transmitted in an EAS command format from the ERCS to the specific ITF.

The ERCS transmits an EAS command to the ITF (S1406). Specifically, the ERCS transmits an EAS command optimized for the ITF to the ITF using the RI data of step S1404.

The ITF processes a second EAS message based on the received EAS command and transmits the processing result in an RI data format to the ERCS (S1407). The RI data of step S1407 may be named "second RI data" to discriminate it from the RI data of step S1404. The RI data of step S1407 may include an EAM status element and a discarded reason element, similar to the RI data of step S1404.

Using the steps shown in FIG. 14 allows a new EAS message to be immediately processed when the specific ITF has not received or processed an EAS message for some reason. It is also possible to transmit a personalized or customized EAS message based on the position of the ITF or subscriber information.

Although FIG. 14 illustrates an example in which a server named "ERCS" transmits an EAS command, a different server may also be designed to be responsible for the functions described above.

FIG. 15 illustrates the case where an EAS command is added to EAS metadata according to an embodiment of the present invention.

As shown in FIG. 15, an EAS command is added to EAS metadata. This allows an EAS message to be reprocessed when the EAS message has failed to be processed unexpectedly. The EAS command shown in FIG. 15 may correspond to the EAS command of step S1406 shown in FIG. 14.

FIG. 16 illustrates details of the EAS command according to an embodiment of the present invention. FIG. 17 illustrates meanings of main elements of the EAS command shown in FIG. 16.

Specifically, FIG. 16 illustrates, in more detail, the structure and schema of the EAS command shown in FIG. 15 and FIG. 17 describes functions of an EAM command type and an EAS command type which are the main elements of the EAS command shown in FIG. 16.

Figure 18:
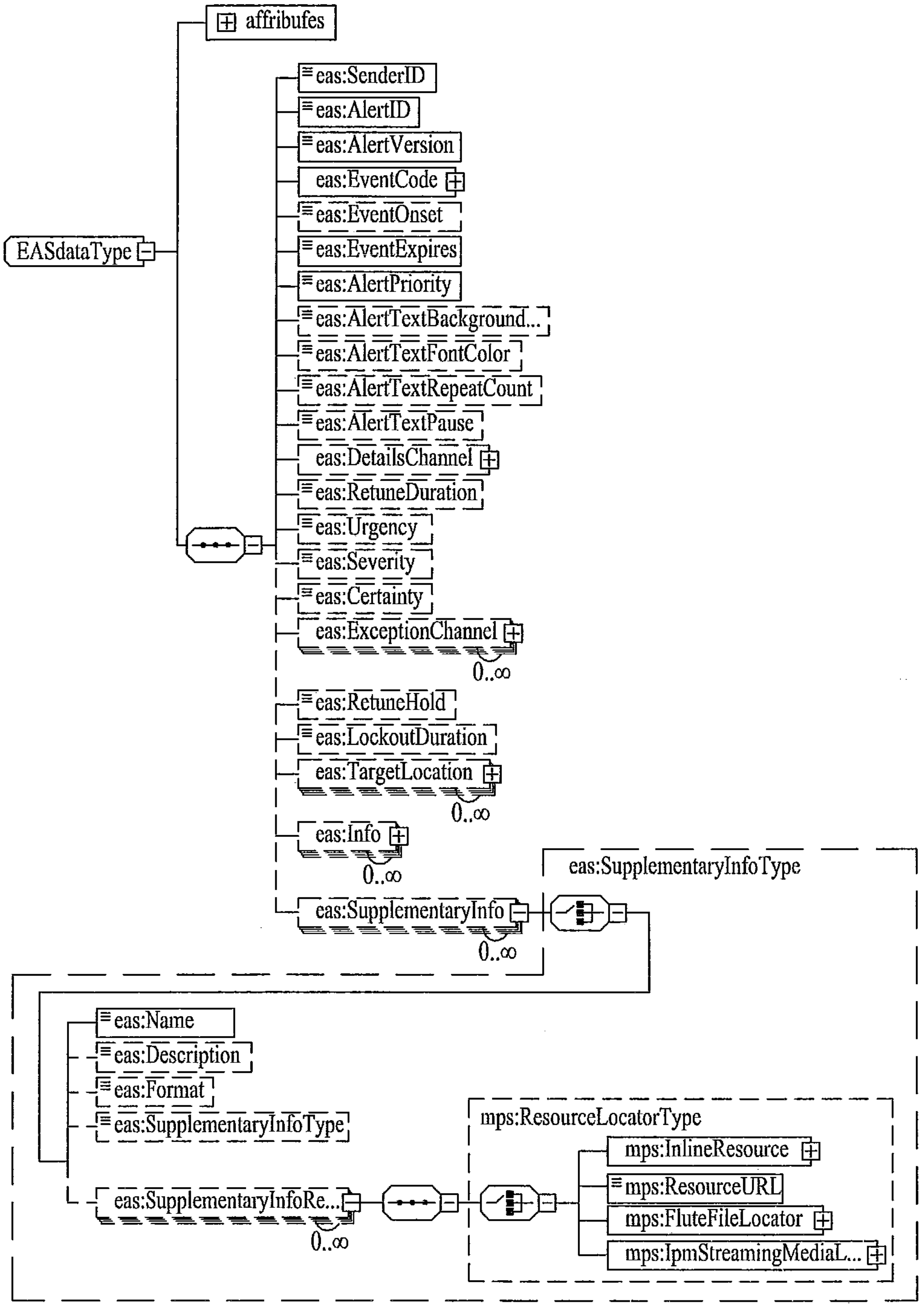
FIG. 18 illustrates the case where a supplementary information element is added to EAS metadata according to another embodiment of the present invention.

FIG. 18 illustrates the case where a supplementary information element is added to EAS metadata according to another embodiment of the present invention.

FIG. 19 illustrates, in more detail, a supplementary information element according to an embodiment of the present invention.

In another method for extending the EAS-related service using bidirectionality (or interactivity) of the IPTV, additional EAS-related information is designed to be directly received or not by selection of the user. This method can be understood from FIGS. 18 and 19.

First, as shown in FIG. 18, EAS data is added to a supplementary information element. A detailed schema of the supplementary information element shown in FIG. 18 is shown in FIG. 19.

A name element shown in FIG. 19 includes a short name of corresponding information and a description element includes a detailed text description.

In addition, a format element includes information of the media type of additional information and may identify, for example, "text", "still image", "video clip", or "audio clip".

Further, an information type element shown in FIG. 19 identifies the type of additional information and may identify, for example, "website", "contacts", "weather picture", "guide map", or "training".

The supplementary information reference element shown in FIG. 19 may also be a resource locator that provides the location of additional information. The supplementary information reference element may be named a "resource element". The resource element is needed to access additional emergency alert information.

The following is a summary of an embodiment of the present invention wherein EAS-related additional information is provided as described above with reference to FIGS. 18 to 19.

An IPTV for processing EAS data receives the EAS data. The EAS data includes first multiple elements and a supplementary information element as shown in FIG. 18. The supplementary information element includes second multiple elements and a resource element. The resource element may correspond to a supplementary information reference element shown in FIG. 19.

The IPTV detects the resource element included in the supplementary information element. The IPTV performs control to access additional emergency alert information using the resource element.

Figure 20:
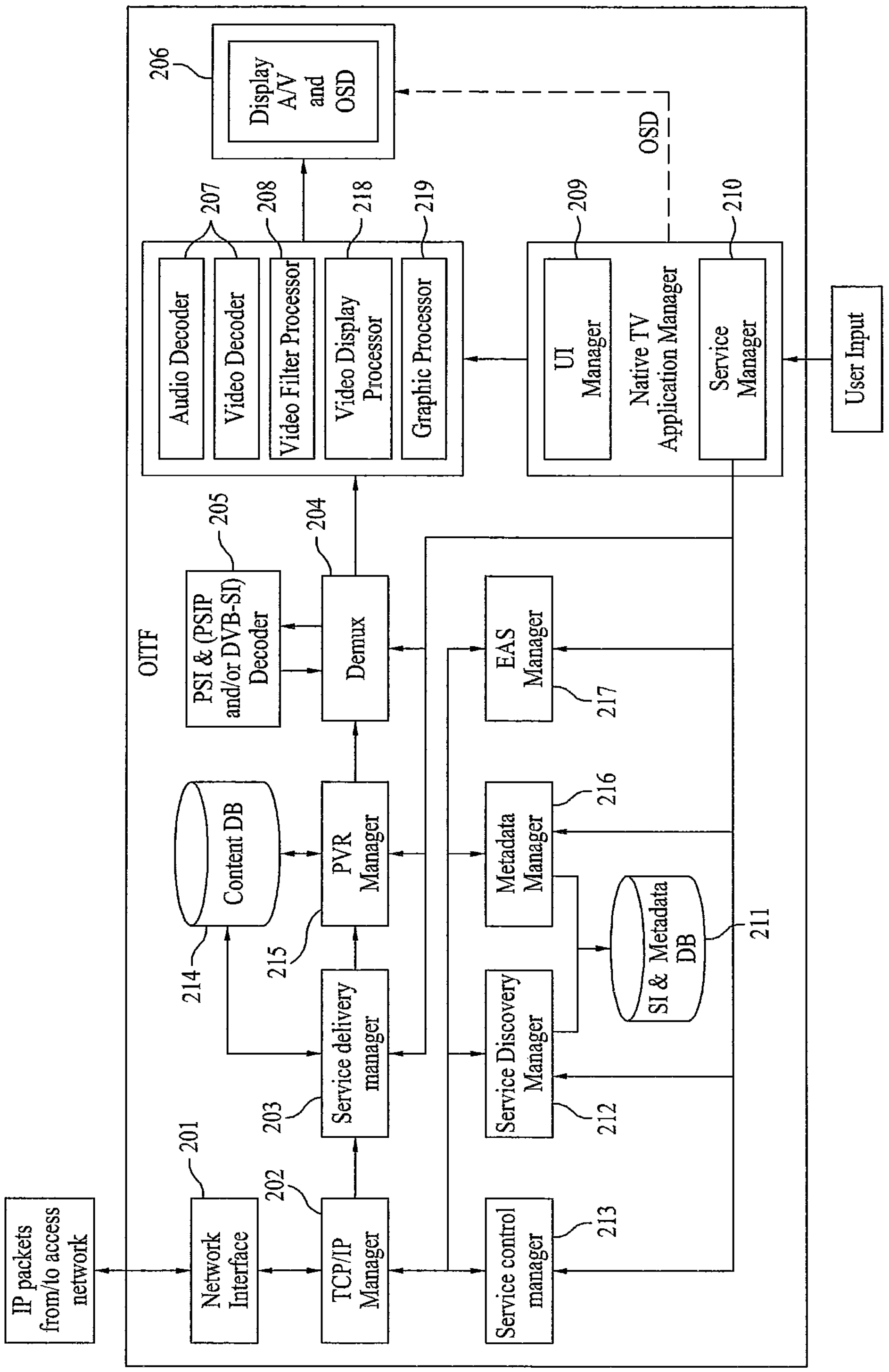
FIG. 20 is a block diagram illustrating an IPTV according to an embodiment of the present invention.

FIG. 20 is a block diagram illustrating an IPTV according to an embodiment of the present invention.

A network interface 201 is responsible for functions associated with receiving/sending IPTV packets and physical & data link layers.

A TCP/IP manager 202 is responsible for functions associated with end to end (source to destination) packet delivery and classifying packets into appropriate protocol managers.

A service delivery manager 203 is responsible for functions associated with handling real-time streaming data and downloading content and also responsible for functions associated with retrieving content from a content DB for later consuming.

A demultiplexer 204 is responsible for functions associated with de-multiplexing audio, video and PSI tables from input transport packets and controlling the de-multiplexing for PSI tables by a PSI Decoder and making the sections of PSI tables and sending the same to the PSI Decoder and controlling the de-multiplexing for A/V transport packets.

A PSI & (PSIP and/or DVB-SI) decoder 205 is responsible for functions associated with setting PIDs for PSI tables and PSIP/DVB-SI tables to the demultiplexer and decoding the private sections of PSI and (PSIP and/or DVB-SI) sent by the demultiplexer. The decoding result is used to de-multiplex input transport packets (e.g., set Audio and Video PID to the demultiplexer).

The decoder 205 also functions as an audio and video decoder for decoding audio and video elementary stream packets.

An A/V and OSD displayer 206 is responsible for functions associated with receiving audio and video data from A/V Decoder, controlling video and audio data, displaying the video data on a screen, outputting the audio data through a speaker, and controlling On Screen Display (OSD) Graphic data.

An audio and video decoder 207 is responsible for functions associated with decoding audio and video elementary stream packets.

A video filter processor 208 is responsible for functions associated with processing the video filter in all areas of user selections or an entire video screen. The video filter processor 208 may access the video frame buffer memory to manipulate or adjust video or still pictures.

A User Interface (UI) manager 209 is responsible for functions associated with supporting the Graphical User Interface on a TV Screen and receiving a user key through a remote control or front panel and managing the states of the entire TV system.

A Service manager 210 is responsible for functions associated with controlling all other managers relating to the services such as service control manager, service delivery manager, IG-OITF client, service discovery manager, and metadata manager services and is also responsible for supporting or providing IPTV services.

An SI & metadata DB 211 is a database of service discovery information and metadata relating to the services.

A service discovery (SD) manager 212 is responsible for functions associated with enabling the discovery of IPTV services over a bi-directional IP network and providing all information for selecting services.

A service control manager 213 is responsible for functions associated with selecting and controlling services and managing sessions, selecting live broadcasting services using an IGMP or RTSP protocol, and selecting VOD content using an RTSP protocol. If IMS is used, the service control manager 213 may use an SIP protocol for initiating and managing sessions through an IMS Gateway. The service control manager 213 may also use the RTSP protocol to control delivery of TV broadcasts, audio, and on-demand data. The RTSP protocol uses persistent TCP connection and allows trick mode control of real-time media streaming.

A Content DB 214 is a database of content which may be delivered by a content download system or may be recorded by a live media TV.

A PVR manager 215 is responsible for functions associated with recording and playing back live streaming content and gathering all necessary metadata of the recorded content and generating additional information for better user experience (e.g. thumbnail image, index etc).

A metadata manager 216 is responsible for functions associated with handling metadata such as TV Anytime, BCG and ECG related to a service.

An EAS manager 217 is responsible for handling EAS messages and performing alerting with the service manager.

A video display processor 218 processes video display information and a graphic processor 219 processes graphic information.

The Real-Time Transport Protocol/RTP Control Protocol (RTP/RTCP) may be used with MPEG-2 TSs. MPEG-2 packets are encapsulated in an RTP. RTP packets may be parsed and the parsed transport packets may be sent to the demultiplexer. Moreover, a feedback on the network reception quality using the RTCP is sent. MPEG-2 transport packets may be carried directly in a UDP without an RTP. For content downloading, HTTP or FLUTE protocol may be used for delivery protocol.

Figure 21:
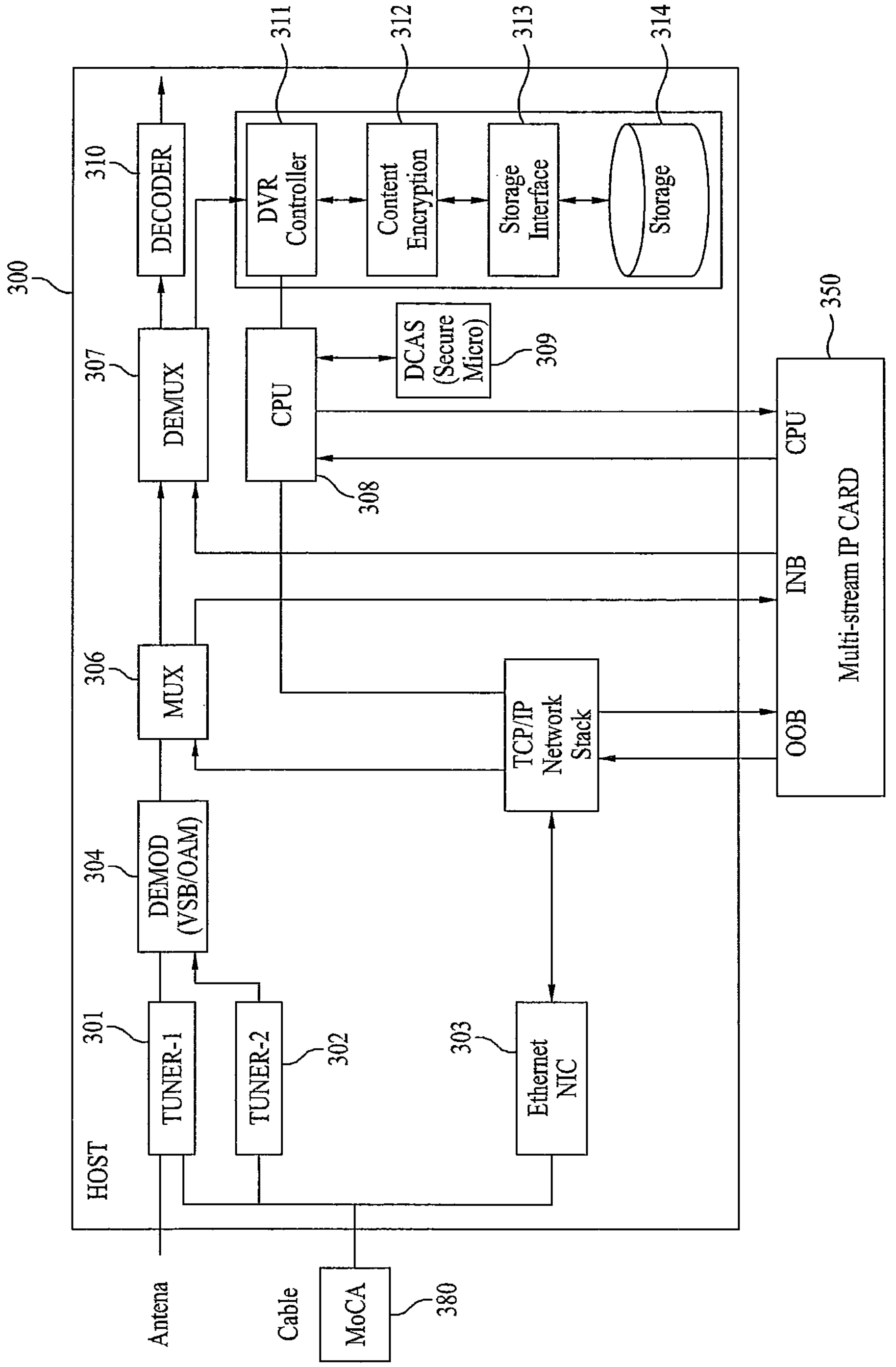
FIG. 21 is a block diagram illustrating a cable/IP hybrid TV according to an embodiment of the present invention.

FIG. 21 is a block diagram illustrating a cable/IP hybrid TV according to an embodiment of the present invention.

Specifically, FIG. 21 illustrates operations of a cable/IP hybrid TV system which can respond to and manage an EAS message on an IP network.

The cable/IP hybrid TV according to an embodiment of the present invention includes a host 300 and a cable card 350. The cable card 350 may be, for example, a multi-stream IP card.

The host 300 includes a tuner-1 301, a tuner-2 302, an Ethernet NIC 303, a demodulator 304, a TCP/IP network stack 305, a multiplexer 306, a demultiplexer 307, a CPU 308, a DCAS 309, a decoder 310, a DVR controller 311, a content encrypter 312, a storage interface 313, and a storage 314.

The following description is given, focusing on main components associated with the present invention.

In the illustrated example, the cable/IP hybrid TV according to the embodiment of the present invention operates in an environment in which a DOCSIS network, which is used in conventional cable environments, is not used. Specifically, in the embodiment of the present invention, a) a DOCSIS modem is not used and b) a CMTS connected to the DOCSIS modem on the network is not used. In addition, c) a DSG tunnel formed between the DOCSIS modem and the CMTS is also not used due to the features a) and b).

Instead, the cable/IP hybrid TV according to the embodiment of the present invention shown in FIG. 21 implements seamless IP-based connectivity over a coaxial network using a Multimedia over Coax Alliance (MoCA) 380.

That is, the MoCA 380 enables IP over Coax.

As shown in FIG. 21, while an Ethernet frame passes through the TCP/IP network stack 305 after passing through the Ethernet NIC 303, it is determined whether the Ethernet frame is to be used at the host 300 or is to be forwarded to the cable card 350 through Layer 2 or Layer 3 routing. Here, Layer 2 routing indicates, for example, a routing scheme based on a destination MAC address in an Ethernet header and Layer 3 routing indicates, for example, a routing scheme based on a destination IP address in an IP header. Whether Layer 2 routing or Layer 3 routing is selected is determined according to implementation of the host.

Provision of a response to the processing result of an EAS message from the cable/IP hybrid TV shown in FIG. 21 and provision of an EAS command from the ERCS in response to the response may be implemented through an IP connection. Additional information items of the EAS message may also be provided through the IP-based connection. The cable/IP hybrid TV may receive and process an EAS message that is broadcast through a cable broadcast network and may respond to and manage the EAS message through the IP connection.

Not only the hybrid receiver shown in FIG. 21 but also a conventional DOCSIS-based cable receiver can support the IP connection through a DOCSIS modem and thereby can perform bidirectional EAS message response and management as described above and also can perform IP-based access and use of additional information.

Although the embodiments of the present invention have been individually described with reference to FIGS. 1 to 21, the features of the embodiments shown in FIGS. 1 to 21 may be combined as needed to implement other embodiments.

According to the embodiments of the present invention described above, an EAS-related server can manage the status of an interactive IPTV since the IPTV provides a response including an EAS message processing result to the EAS-related server. In addition, it is possible to customize a method for transmitting an EAS message to each IPTV according to the status of the IPTV or the EAS message processing status. Further, it is possible to provide additional information regarding the EAS message.

Each of the methods according to the present invention may be implemented in the form of program commands that are executable by a variety of computer means and may then be recorded on a computer-readable medium. The computer-readable medium may include program commands, data files, data structures, and the like individually or in combination. The program commands recorded on the medium may be specially designed and configured for the present invention or may be known and available to those skilled in computer software. Examples of the computer-readable recording medium include magnetic media such as a hard disk, a floppy disk, and a magnetic tape, optical media such as a CD-ROM and a DVD, magneto-optical media such as a floptical disk, and hardware devices specially configured to store and execute program commands such as a ROM, a RAM, and a flash memory. Examples of the program commands include not only machine language code such as that produced by a compiler but also high-level language code that may be executed by a computer using an interpreter or the like. The hardware devices described above may be configured to operate as one or more software modules to perform the operations of the present invention, and vice versa. Although the present invention has been described in conjunction with the limited embodiments and drawings, the present invention is not limited to the embodiments. Those skilled in the art will appreciate that various modifications, additions and substitutions are possible from this description. Therefore, the scope of the present invention should not be limited to the description of the exemplary embodiments and should be determined by the appended claims and their equivalents.

What is claimed is:

1. A method of processing emergency alert system (EAS) data in a system comprising a digital broadcast receiver for selectively communicating with two servers, the method comprising:

receiving, by the digital broadcast receiver and from an EAS Ingestion System (EIS) server, the EAS data, wherein the EAS data comprises multiple elements and is sent directly from the EIS server to the digital broadcast receiver while bypassing an EAS Response Control System (ERCS) server;

processing, by the digital broadcast receiver, an EAS message based on the received EAS data;

determining if the processing of the EAS message was successful;

when the determining step determines the EAS message was not successfully processed, sending Response Information (RI) data the ERCS server without sending the RI data to the EIS server, wherein the RI data comprises an emergency alert message (EAM) status element and a discarded reason element identifying a specific reason among multiple reasons why the EAS message was not successfully processed;

generating, at the ERCS server, an EAS command that is optimized for the digital broadcast receiver based on the discarded reason element included in the RI data;

receiving, by the digital broadcast receiver and from the EIS server, the EAS command at a changeable interval depending on the discarded reason;

processing, by the digital broadcast receiver, a second EAS message based on the received EAS command; and sending, by the digital broadcast receiver, second RI data to the ERCS server, wherein the second RI data comprises a second EAM status element and a second discarded reason element identifying a specific reason among the multiple reasons why the second EAS message was not successfully processed.

2. The method according to claim 1, wherein the elements are defined as XML schema types.

3. The method according to claim 1, wherein the digital broadcast receiver corresponds to an Internet Protocol Television (IPTV) or an interactive TV.

4. A method of processing emergency alert system (EAS) data in a system comprising a digital broadcast receiver for selectively communicating with two servers, the method comprising:

receiving, by the digital broadcast receiver and from an EAS Ingestion System (EIS) server, the EAS data, the EAS data including a first multiple elements and a supplementary information element and being sent directly from the EIS server to the digital broadcast receiver while bypassing an EAS Response Control System (ERCS) server, wherein the supplementary information element comprises a second multiple elements and a resource element necessary to access additional emergency alert information;

detecting the resource element included in the supplementary information element;

controlling access to the additional emergency alert information using the resource element;

sending Response Information (RI) data to the ERCS server without sending the RI data to the EIS server, wherein the RI data comprises an emergency alert message (EAM) status element and a discarded reason element identifying a specific reason among multiple reasons why the EAS message was not successfully processed;

generating, at the ERCS server, an EAS command that is optimized for the digital broadcast receiver based on the discarded reason element included in the RI data;

receiving, by the digital broadcast receiver and from the EIS server, the EAS command at a changeable interval depending on the discarded reason;

processing, by the digital broadcast receiver, a second EAS message based on the received EAS command; and sending, by the digital broadcast receiver, second RI data to the ERCS server, wherein the second RI data comprises a second EAM status element and a second discarded reason element identifying a specific reason among the multiple reasons why the second EAS message was not successfully processed.

5. The method according to claim 4, wherein the resource element corresponds to a locator identifying a location of the additional emergency alert information.

6. The method according to claim 5, wherein the locator includes at least one of an in-line resource, a URL resource, a FLUTE file locator, and an Ipm streaming media locator.

7. The method according to claim 4, wherein the second multiple elements include at least one of a name element, a description element, a format element, and an information type element.

8. The method according to claim 7, wherein the name element defines a short name of corresponding information;

the description element defines detailed text information;

the format element identifies a media type of the additional emergency alert information; and the information type identifies a type of the additional emergency alert information.

9. The method according to claim 4, wherein the digital broadcast receiver corresponds to an Internet Protocol Television (IPTV) or an interactive TV.

10. A method of processing emergency alert system (EAS) data in a system comprising a digital broadcast receiver for selectively communicating with two servers, the method comprising:

receiving, by the digital broadcast receiver and from an EAS Ingestion System (EIS) server, the EAS data, wherein the EAS data is sent directly from the EIS server to the digital broadcast receiver while bypassing an EAS Response Control System (ERCS) server;

processing, by the digital broadcast receiver, an EAS message based on the received EAS data;

displaying a reporting message identifying whether the EAS message is processed without error;

when the reporting message identifies the EAS message was not processed without error, sending Response Information (RI) data the ERCS server without sending the RI data to the EIS server, wherein the RI data comprises an emergency alert message (EAM) status element and a discarded reason element identifying a specific reason among multiple reasons why the EAS message was not successfully processed;

generating, at the ERCS server, an EAS command that is optimized for the digital broadcast receiver based on the discarded reason element included in the RI data;

receiving, by the digital broadcast receiver and from the EIS server, the EAS command at a changeable interval depending on the discarded reason;

processing, by the digital broadcast receiver, a second EAS message based on the received EAS command; and sending, by the digital broadcast receiver, second RI data to the ERCS server, wherein the second RI data comprises a second EAM status element and a second discarded reason element identifying a specific reason among the multiple reasons why the second EAS message was not successfully processed.

11. A digital broadcast receiver for processing emergency alert system (EAS) data and selectively communicating with two servers, the digital broadcast receiver comprising:

a receiving module configured to receive the EAS data from an EAS Ingestion System (EIS) server, wherein the EAS data is sent directly from the EIS server to the digital broadcast receiver while bypassing a EAS Response Control System (ERCS) server;

a processor configured to process an EAS message based on the received EAS data and determine if the processing of the EAS message was successful;

a transmitter configured to send Response Information (RI) data to the ERCS server without sending the RI data to the EIS server when the processor determines the processing of the EAS message was not successful; and a controller configured to:

generating, at the ERCS server, an EAS command that is optimized for the digital broadcast receiver based on the discarded reason element included in the RI data;

send Response Information (RI) data to the ERCS server, wherein the RI data comprises an emergency alert message (EAM) status element and a discarded reason element identifying a specific reason among multiple reasons why the EAS message was not successfully processed, receive an EAS command which is optimized by the ERCS server based on the discarded reason element included in the RI data, wherein the EAS command is transmitted at a changeable interval depending on the discarded reason, process a second EAS message based on the received EAS command, and send second RI data to the ERCS server, wherein the second RI data comprises a second EAM status element and a second discarded reason element identifying a specific reason among the multiple reasons why the second EAS message was not successfully processed.

12. The digital broadcast receiver according to claim 11, wherein the digital broadcast receiver corresponds to an Internet Protocol Television (IPTV) or an interactive TV.

13. The method according to claim 1, wherein if the determining step determines the EAS message was successfully processed, the RI data is not sent to ERCS server.

14. The method according to claim 1, wherein the EAS command sent from the ERCS server instructs the broadcast receiver to change an initial processing method for processing the EAS command to a new processing method identified in a specific field of the EAS command.

15. The method according to claim 14, wherein the new processing method includes one of 1) reprocessing the EAS message according to alert priority processing of the broadcast receiver, 2) immediately activating the EAS message, 3) rescheduling the EAS message to be processed according to a set time or priority, and 4) discarding the EAS message.

16. The method according to claim 4, wherein if the EAS message was successfully processed, the RI data is not sent to ERCS server.

17. The method according to claim 4, wherein the EAS command sent from the ERCS server instructs the broadcast receiver to change an initial processing method for processing the EAS command to a new processing method identified in a specific field of the EAS command.

18. The method according to claim 17, wherein the new processing method includes one of 1) reprocessing the EAS message according to alert priority processing of the broadcast receiver, 2) immediately activating the EAS message, 3) rescheduling the EAS message to be processed according to a set time or priority, and 4) discarding the EAS message.

19. The method according to claim 10, wherein if the reporting message identifies the EAS message was successfully processed, the RI data is not sent to ERCS server.

20. The method according to claim 10, wherein the EAS command sent from the ERCS server instructs the broadcast receiver to change an initial processing method for processing the EAS command to a new processing method identified in a specific field of the EAS command.

21. The method according to claim 20, wherein the new processing method includes one of 1) reprocessing the EAS message according to alert priority processing of the broadcast receiver, 2) immediately activating the EAS message, 3) rescheduling the EAS message to be processed according to a set time or priority, and 4) discarding the EAS message.

22. The digital broadcast receiver according to claim 11, wherein if the processor determines the EAS message was successfully processed, the RI data is not sent to ERCS server.

23. The digital broadcast receiver according to claim 11, wherein the EAS command sent from the ERCS server instructs the broadcast receiver to change an initial processing method for processing the EAS command to a new processing method identified in a specific field of the EAS command.

24. The digital broadcast receiver according to claim 23, wherein the new processing method includes one of 1) reprocessing the EAS message according to alert priority processing of the broadcast receiver, 2) immediately activating the EAS message, 3) rescheduling the EAS message to be processed according to a set time or priority, and 4) discarding the EAS message.

* * * * *